United States Patent [19]

Kapplinger

[11] 4,100,885
[45] Jul. 18, 1978

[54] STOCK WATERER

[75] Inventor: Lawrence E. Kapplinger, Spring Lake Park, Minn.

[73] Assignee: Advanced Engineering & Manufacturing Company, Inc., Minneapolis, Minn.

[21] Appl. No.: 748,059

[22] Filed: Dec. 6, 1976

[51] Int. Cl.² .............................................. A01K 7/02
[52] U.S. Cl. ..................................................... 119/73
[58] Field of Search .................................... 119/73, 78

[56] References Cited

U.S. PATENT DOCUMENTS

| | | | |
|---|---|---|---|
| 1,575,796 | 3/1926 | Scheihing | 119/78 |
| 1,782,350 | 11/1930 | Hupp | 119/73 |
| 2,514,065 | 7/1950 | Hupp | 119/73 |
| 3,150,639 | 9/1964 | Sereda | 119/78 |

Primary Examiner—Hugh R. Chamblee
Attorney, Agent, or Firm—Dorsey, Windhorst, Hannaford, Whitney & Halladay

[57] ABSTRACT

A stock watering device for preventing water therein from freezing during cold weather and for keeping the water therein cool during hot weather. The device includes an insulated tank, an insulated cover portion, a float valve for maintaining water within the tank at a predetermined level and a drinking well provided in the cover portion for providing drinking access. The drinking well includes a lower continuous edge extending below the predetermined level of water to form an effective seal between the interior of the insulated tank and the ambient weather conditions.

11 Claims, 5 Drawing Figures

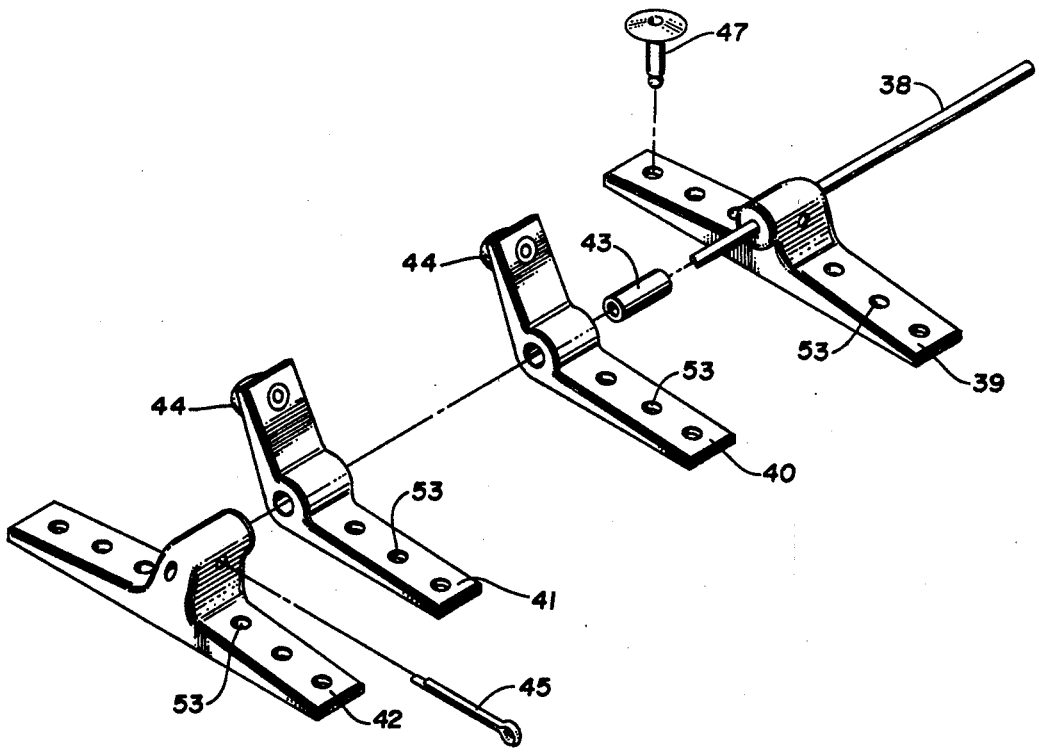

STOCK WATERER

BACKGROUND OF THE INVENTION

The present invention relates generally to a livestock watering device, and more particularly, to a livestock watering device which will prevent water within the device from freezing during the winter months, but which will also keep the water relatively cool during the hot summer months.

A primary object in the design of livestock watering tanks is to provide a unit which will prevent the drinking water from freezing when the temperature drops below the freezing point. This is obviously a very important objective since if the water is allowed to freeze, the livestock cannot drink it. It is also important that the tank be constructed to keep the water relatively cool during the summer months. Many attempts have been made to construct stock watering tanks which meet these objectives. Several have included an electric tank heater to prevent the water from freezing during the winter months. Such structures, however, are quite expensive to operate and are generally unable to also keep the water cool during the summer months. Other types of stock waterers have been constructed of foam or insulated materials for keeping the water from freezing during the winter months and cool during the summer months. Although these watering devices have been effective to some extent, they have not been completely satisfactory since they are often unable to keep the water in the tank sheltered when the animal is drinking. Thus, at very low temperatures, these prior devices have not been completely acceptable. Thus, there is a real need for the development of a stock watering device which not only prevents the water from freezing during the winter months, even at subzero temperatures, but which also keeps the water relatively cool during the hot summer months.

SUMMARY OF THE INVENTION

The present invention is an improved stock watering device which keeps the water relatively cool during the hot summer months and which also effectively prevents the water from freezing at subzero temperatures during the winter months. In addition, the stock watering device of the present invention is adaptable for use by all types of animals, including hogs who are relatively short animals with a very short neck.

In general, the livestock waterer of the present invention includes an insulated body portion constructed of an insulative foam material and defining a water tank, an insulated cover constructed of a foam material adapted for connection to the body portion in a generally sealed relationship, and a means for maintaining the water level within the tank at a predetermined level. The watering device of the present invention also includes at least one drinking well by which the animal using the tank is given access to the water. This drinking well is such that it exposes only a limited portion of the surface of the water in the tank to the ambient weather conditions while the animal is drinking, thereby significantly reducing the heat which is lost from the water while the tank is being used.

It is known that in order for water to freeze, its temperature must first be reduced to the freezing point (32° F.), after which the latent heat of fusion must be removed from the water. When this is accomplished, the liquid water will freeze. Thus, the length of time for a particular body of water to freeze will depend on the rate at which heat is allowed to escape from the water and the size of the body of water. The larger the body of water and the smaller the rate of heat loss, the longer it takes the water to freeze. This is the basic principal upon which the structure of the present invention is based. In the present invention, the structure of the tank is designed so as to limit the rate of heat loss from the water as much as possible. This is accomplished by providing drinking access to only a limited portion of the water. Thus, only this limited portion is actually exposed to the ambient weather conditions during the time that the animal is drinking. The limited access portion includes a generally cup-shaped member or drinking well which is integrally formed as part of the insulated cover. This cup-shaped member has an open bottom with a continuous lower edge which extends below the surface level of the water in the watering tank. This particular structure not only provides drinking access to the animal, but also forms an effective seal between the interior portion of the watering tank and the ambient weather conditions to limit the amount of surface area of the water which is actually exposed to the outside weather conditions. The volume of water within the tank as compared to the surface area of water within the drinking wells is also sufficiently large to prevent the water from freezing during subzero temperatures.

The stock watering device of the present invention also includes a hinged cover which is lifted by the animal when a drink is desired, and which includes a recessed portion adapted for cooperation with an upper portion of the drinking well to help prevent exposure of even the limited access portion when the watering tank is not being used.

Accordingly, it is an object of the present invention to provide an improved stock watering device which prevents the water from freezing during sub-zero temperatures and which also keeps the water relatively cool during the hot summer months.

Another object of the present invention is to provide an improved stock watering device which includes a drinking well which limits the amount of water in the tank which is exposed to ambient weather conditions when the animal is drinking from the tank.

A further object of the present invention is to provide an improved livestock watering device which is adaptable for use by all types of animals including hogs which are short and have a relatively short neck.

Another object of the present invention is to provide an improved livestock watering device having a drinking well with a continuous lower edge extending below the level of the water to form an effective seal between the interior tank and the outside air.

These and other objects of the present invention will become apparent with reference to the drawings, the description of the preferred embodiment and the appended claims.

DESCRIPTION OF THE DRAWINGS

FIG. 5 is a pictorial view of the hinge mechanism.

DESCRIPTION OF THE PREFERRED EMBODIMENT

Figure 1:
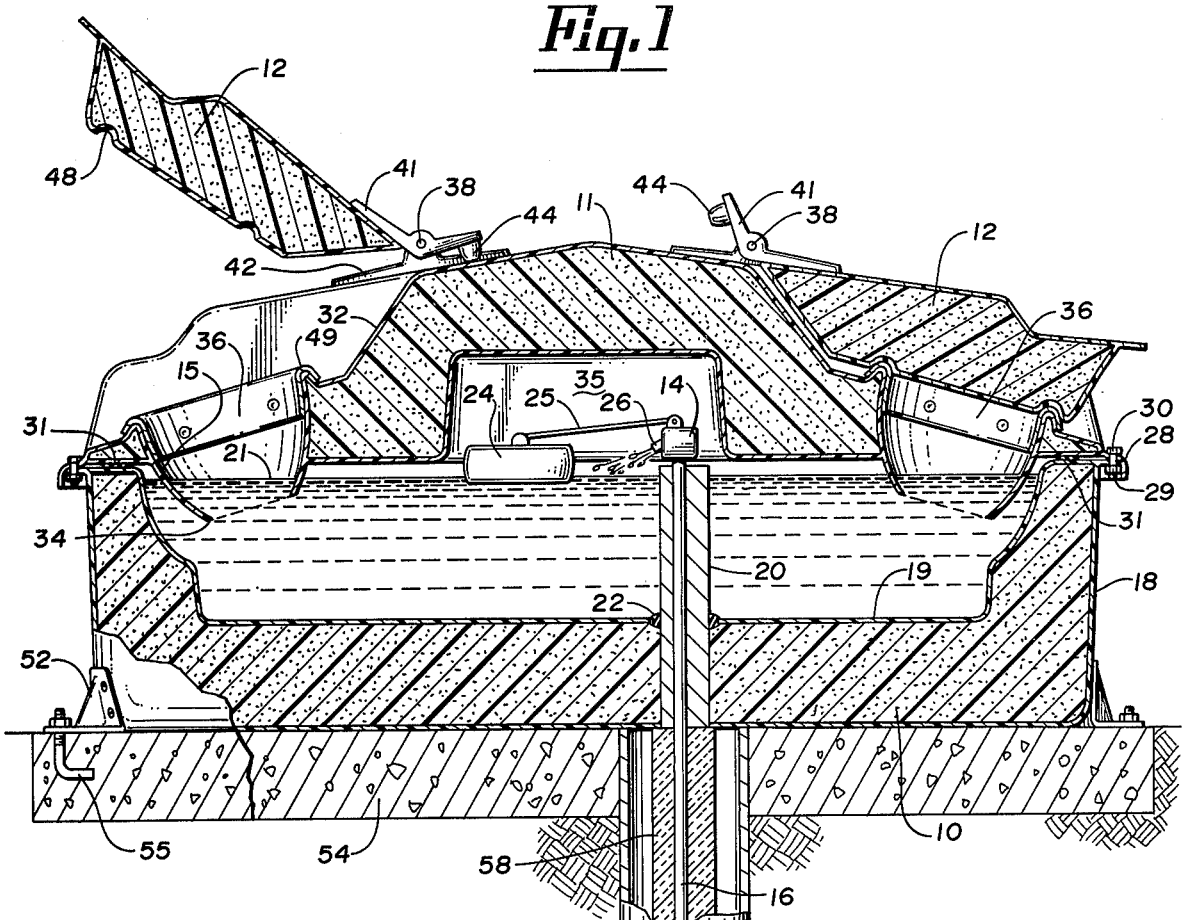
FIG. 1 is a sectional view of the stock watering device of the present invention as viewed along the line 1—1 of FIG. 3.

With reference first to FIG. 1, the improved livestock watering device of the present invention includes an insulated base tank 10, an insulated cover 11, a pair of insulated drinking lids 12, 12 which are hinged to the cover 11 and a drinking well 15 having a lower continuous edge 34 extending below the surface of the water level in the tank to form an effective seal between the interior of the tank and the ambient weather conditions. The improved livestock watering device also includes a means 16 for supplying water to the tank and a float valve assembly 14 for maintaining water in the tank at a desired level.

Figure 2:
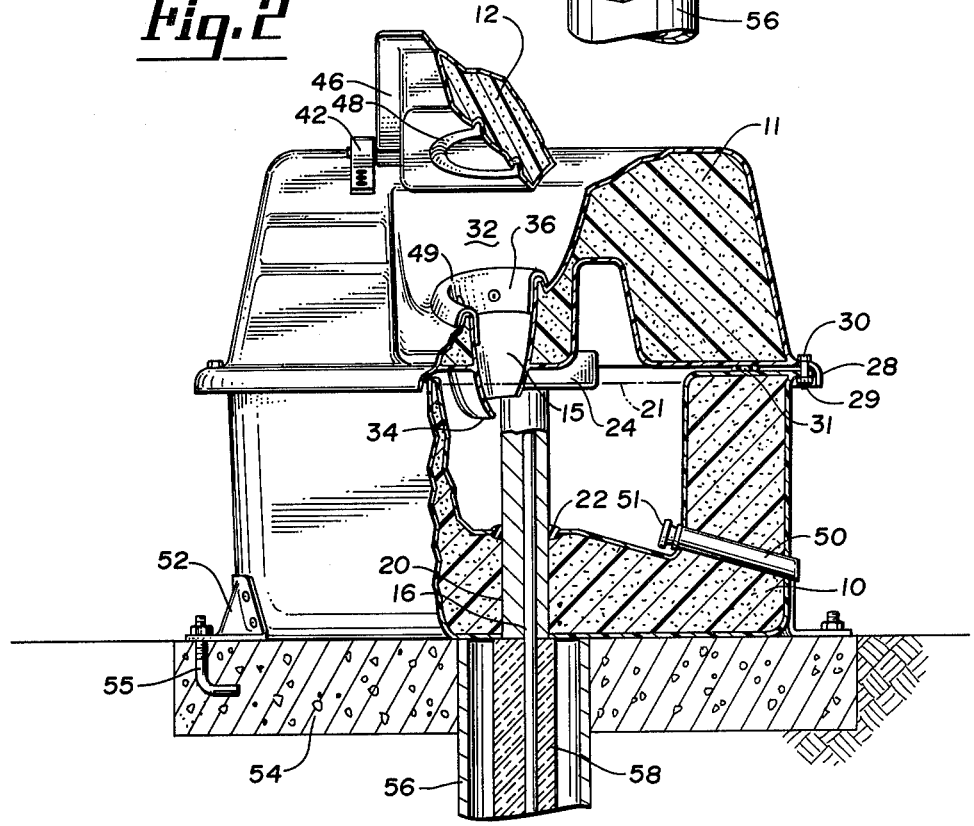
FIG. 2 is an end plan view, partially in section, of the stock watering device of the present invention.
Figure 4:
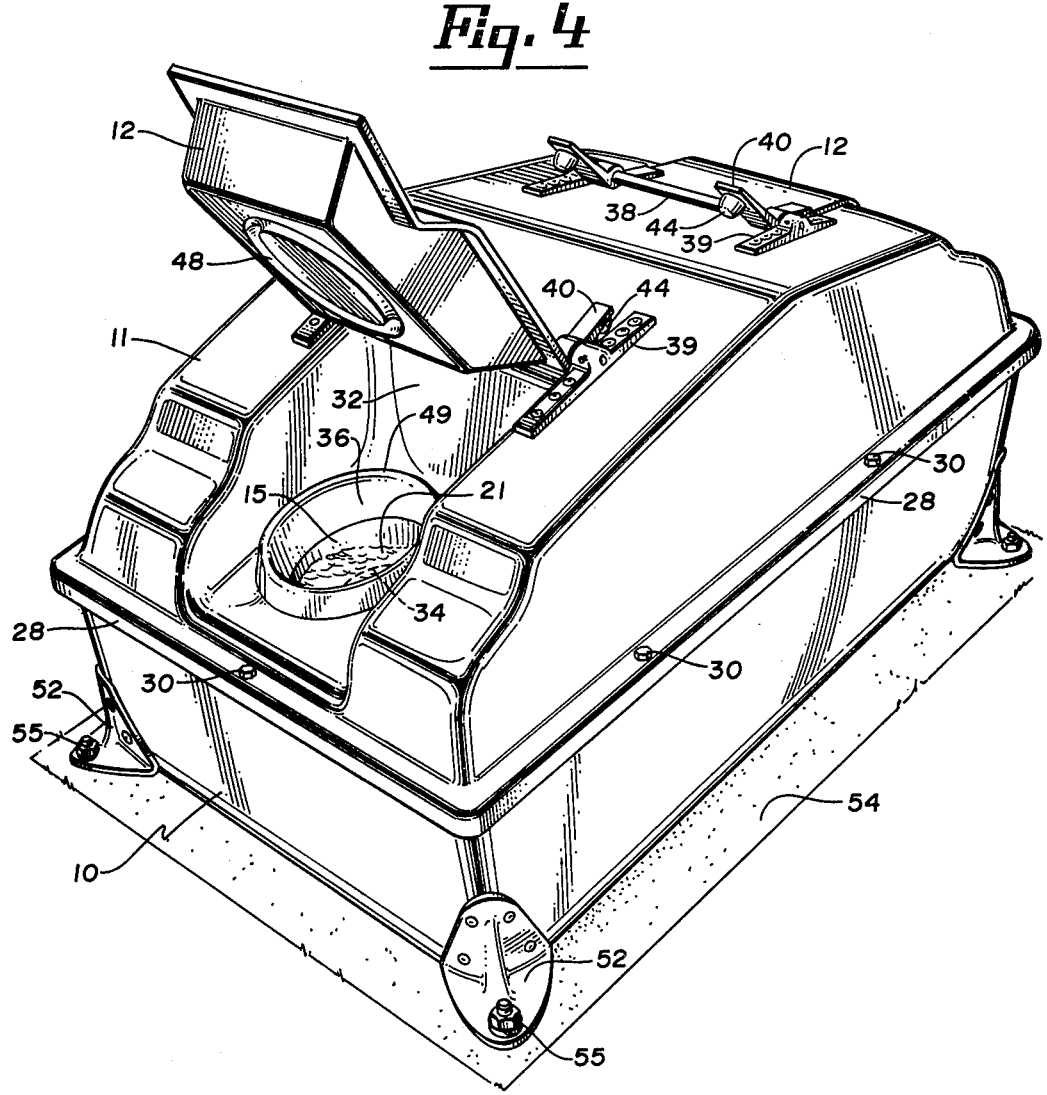
FIG. 4 is a pictorial view of one end of the stock watering device with one of the lid members in an open position.
Figure 3:
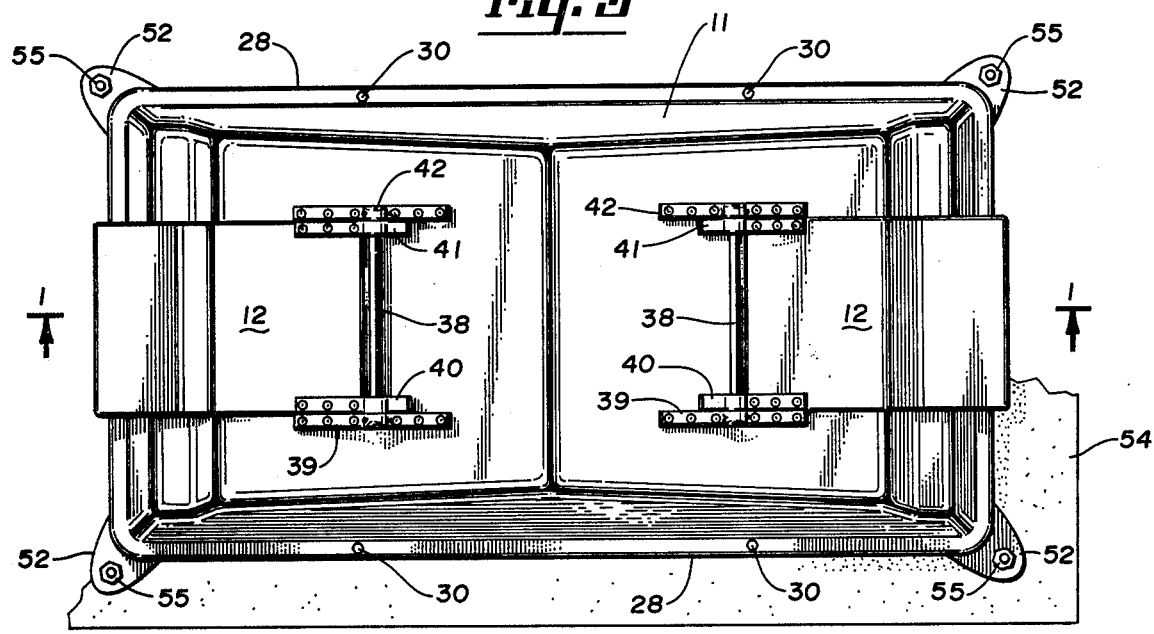
FIG. 3 is a top plan view of the stock watering device of the present invention.

As illustrated in FIGS. 1 and 2, the insulated base tank 10 includes an pouter surface 18 defining the outer surface of the watering device and an inner surface 19 which forms and defines an inner tank for holding the water. The tank 10 is constructed of an insulative, foam material which is covered throughout its entirety by a thin layer of fiberglass. In the preferred embodiment, the foam material used to form the tank 10 and the various other insulative portions of the present invention is a type of ureaformaldehyde resin which is manufactured by Arctic Foam, Inc. of Chicago City, Minnesota, under the trademark "Arctic Foam". A plastic pipe or tube 20 is disposed to one side of the center of the tank 10 as illustrated in FIG. 1 and extends upwardly from the lower surface of the base to a position just above the water level 21. A rubber gasket or grommet type member 22 is disposed between the inner surface of the base tank 10 and the outer cylindrical surface of the tube 20 to form a water tight seal therebetween to prevent water from leaking out of the tank.

A fresh water inlet pipe 16 extends from a source of water (not shown) to a conventional float valve 14 for supplying water to the tank. The fresh water inlet 16 comprises a pipe or conduit which extends up through the tubular member 20 and is threadedly secured to the float valve 14. The connection between the float valve 14 and the inlet pipe 16 is such that the upper end of the tubular member 20 is sealed when the inlet pipe 16 and float valve 14 are properly connected. The float valve 14 includes a water float 24, a connecting lever 25 and a water outlet 26. The connecting lever 25 extends between the main valve portion of the float valve 14 and the float 24 to transfer movement of the float 24 to the valve. The float valve 14 functions to maintain the water in the tank at the desired level. Thus, when the water level 21 is below a certain desired level, water will be allowed to enter the tank through the outlet 26. When the water level reaches the level desired, the buoyancy force acting on the water float 24 will close the valve 14 preventing additional water from entering the tank.

With reference to FIGS. 1-4, the insulated cover 11, similar to the base tank 10, is constructed of an insulative, foam material covered by a thin layer of fiberglass over its entire exterior surface. The lower circumferential dimensions of the cover 11 approximate the corresponding dimensions of the base tank 10 to allow the cover 11 to rest upon and cover the tank 10. To enable the cover 11 to be tightly secured to the base tank 10, the cover 11 includes a downwardly curved lip portion 28 extending about the periphery of its lower edge. The lip portion 28 mates with a lip portion 29 extending outwardly from the base tank 10. A plurality of bolt assemblies 30 extend through the lip portions 28 and 29 to secure the cover 11 to the base 10. A cover gasket 31 extends around the entire tank between the cover 11 and the tank 10 to seal the interior of the tank from the ambient weather conditions.

The cover 11 includes a pair of recessed portions 32 at each end. A drinking well 15 is integrally joined with the insulated cover 11 about the periphery of the drinking well 15 at each of these recessed portions 32 to provide drinking access for the animal. As illustrated, the drinking well 15 is a generally cup-shaped portion defined by a fiberglass surface and including a lower continuous, closed loop edge 34 disposed below the water level 21. Because this continuous lower edge 34 is disposed below the water level 21, an effective seal is formed between the interior of the tank 35 above the water level 21 and the ambient weather conditions. This construction of the drinking well 15 allows only that water surface within the well to be exposed to the ambient weather conditions when the watering device is being used. The upper portion of the drinking well 15 includes an upper continuous edge capped by a stainless steel lip 36 extending around the well to prevent the hog or other animal from chewing on the fiberglass edge. This upper edge is disposed in a plane which slopes downwardly toward the outer edge of the insulated tank to provide easy drinking access.

A pair of insulated lids 12 are hinged to the cover 11 and positioned to generally seat within the recessed portions 32. Each of the lids 12 is constructed of an insulative, foam material similar to the cover 11 and the base tank 10, and each is covered with a thin layer of fiberglass. As shown best in FIGS. 1, 3 and 5, each of the lids 12 is hinged to the cover 11 about a stainless steel hinge rod which extends through the hinge elements 39, 40, 41 and 42 is movable between a closed and an open position with respect to the drinking well. The hinge elements 39 and 42 are outer lid hinge elements which are riveted directly to the outer fiberglass surface of the cover 11 at each end of the lid 12. The hinge element 40 and 41 are lid hinge elements which are riveted directly to one end of the upper surface of the lid near its outer edges. The rod 38 is then extended through each of the elements 38-42 to secure the lid 12 to the cover 11. As shown best in FIGS. 1 and 5, each of the hinge elements 40 and 41 includes two sections, one which is riveted to the upper surface of the lid 12 and the other which extends generally upwardly away from the cover 11 when the lid 12 is in its closed position. A stop means in the form of a rubber bumper element 44 is connected with the ends of each of these outwardly extending portions to cushion the lid 12 when it is opened and to serve as a stop to limit the extend to which the lid 12 can be opened. The structure of the hinge elements 40 and 41 is such that the lid 12 will not remain in an open position without external support. Thus, when the animal is finished drinking and the lid 12 is released, it will return to its normal, closed position. This is perhaps best illustrated in FIG. 1 wherein the lid 12 on the lefthand side of the drawing is shown in its fully opened position. Unless the lid 12 is held in this position by the animal or some other external means, it will fall back to a closed position similar to the lid 12 on the righthand side of FIG. 1. The rod 38 is retained within the outer hinge members 39 and 42 by a cotter pin 45. Also, a bushing 43 is positioned within each of the members 40 and 41 about the rod 38 to permit pivotal movement of the lid 12 relative to the cover 11.

With reference to FIG. 2, the lid 12 includes a generally central body portion which, as illustrated also in FIG. 1, is intended to fit within the recessed portion 32. The lid 12 also includes a peripheral edge or lip portion extending outwardly from the central body portion and adapted to overlap slightly with respect to a portion of the cover 11. This lip portion allows the animal desiring water to lift the lid with its nose or forehead, and thus gain access to the water. A generally circular, slightly recessed seat porton or groove 48 is positioned on the lower surface of each of the lids 12 for engagement with the upper continuous edge portion 49 of the drinking well 15. The upper edge 49 and the recessed portion 48 mate with one another when the lid 12 is in a closed position to additionally seal the interior of the stock watering device from the ambient weather conditions. Although the present embodiment illustrates two drinking wells 15 within the present tank, a number of drinking wells 15 and corresponding lids 12 could be constructed within a particular tank without affecting the efficiency of the device; provided the volume of water within the tank is sufficiently large.

In this respect it should be understood that before water in the insulated tank will freeze, the temperature of the water must first be reduced to 32° F. Then the latent heat of fusion must be removed from the water. To reduce the temperature of the water to 32° F., one B.T.U. per pound of water per degree Fahrenheit must be removed. To remove the latent heat of fusion, a loss of 74 B.T.U.'s per pound of water is required. Thus, the smaller the rate of heat loss and the greater the volume of water within the tank, the longer the water in the tank can be maintained in an unfrozen state. There are many other factors which also affect the length of time that water in the tank can be maintained in an unfrozen state such as the temperature of the water which is supplied to the tank, the effectiveness of the insulation from which the tank is constructed, the number of animals using the tank, etc. In general, however, it has been found that the ratio of the water surface within the drinking wells (in square inches) to the volume of water within the tank (in cubic inches) is important. In one of the commercial embodiments, this ratio is approximately 1 to 76; in another this ratio is about 1 to 89. It is believed, however, that for an acceptable stock watering device, this ratio should be less than approximately 1 to 70.

Referring again to FIG. 2, the lower tank portion 10 includes a drain tube 50 for draining water from the tank during cleaning. A rubber drain stopper 51 is associated with the drain tube 50 to selectively open and close the drain. As shown in FIGS. 1 and 2, a base casting 52 is disposed at each of the lower corners of the tank 10 for anchoring the tank to the concrete slab 54. The castings or brackets 52 are secured to the tank 10 by a plurality of blind rivets and are secured to the concrete slab 54 by a plurality of anchor bolts 55 which are set into the concrete and extend through a portion of the brackets 52.

Disposed below the base tank 10 and extending through the concrete slab 54 and below the tank 10 for housing the fresh water supply conduit 16 is a section of polyvinylchloride conduit 56. The fresh water inlet conduit 16 extends through the conduit 56 up through the tubular section 20 to the float valve 14. In the preferred embodiment, a portion of the inlet conduit 16 extending below the tank 10 is wrapped with a suitable insulative material 58 to prevent the water in the conduit 16 from freezing during extremely cold weather.

Having described the structure of the stock watering device of the present invention, the operation can be understood as follows: After installation of the watering device onto the concrete slab 54 via the brackets 52, the water source is turned on and the tank 10 is allowed to fill through the float valve 14 up to the water level 21. When this level is reached, the water float 24 and lever arm 25 will be in a position to stop further flow of water through the valve 14. As illustrated in FIGS. 1 and 2, the water level 21 is slightly above the lower continuous edge 34 of the drinking well 15. Although it is important only the the water level 21 be sufficient to form a seal about the lower edge 34, in the preferred embodiment, the float valve 14 is adjusted so that the the water level 21 will be maintained about one-half inch above the lower edge 34. With this construction, the entire interior portion of the device and the water surface within the interior of the tank are shielded from the ambient weather conditions. When an animal desires to drink, it lifts one of the lids 12 with its nose or head and drinks from the drinking well 15. When the animal has finished drinking, the lid 12 automatically closes, due to the fact that the opening of the lid 12 is limited by the stop member 44. Even while animals are drinking from the watering device, only the very small surface area of water within the drinking well 15 is exposed to the ambient weather conditions; thus, heat from the entire body of water within the tank is lost only through this relatively small surface area. Because of this, most of the water within the tank is protected from the elements and as a result, will not freeze despite very cold temperatures.

Although the description of the preferred embodiment of the present invention has been quite specific, it is contemplated that various modifications and changes could be made to the preferred structure without deviating from the spirit of the present invention. Accordingly, the inventor intends that the scope of the present invention be dictated by the appended claims rather than by the description of the preferred embodiment.

I claim:

1. A stock watering device comprising:
    an insulated tank for receiving a quantity of water, said insulated tank having an insulated cover portion;
    means for maintaining the water within said insulated tank at a predetermined level;
    at least one drinking well provided in said insulated cover portion for providing limited drinking access to the water within said insulated tank, said drinking well being joined with said insulated cover portion at a peripheral edge of said drinking well to form a generally airtight seal therewith and having a lower continuous edge extending below said predetermined level to form an effective seal between the interior of said insulated tank and the ambient weather conditions and a continuous upper surface portion forming a closed loop; and
    a lid pivotally connected with said insulated cover portion at a point spaced from said continuous upper surface portion, said lid being movable between an open and a closed position with respect to said drinking well and having a seat portion for engagement with said upper continuous surface along substantialy the entire length thereof when said lid is in a closed position.

2. The stock watering device of claim 1 wherein two drinking wells are provided in said insulated cover portion.

3. The stock watering device of claim 1 wherein the ratio of the total surface area of water within all of said drinking wells (in square inches) to the volume of water within said insulated tank (in cubic inches) is less than approximately 1 to 70.

4. The stock watering device of claim 1 wherein said lower continuous edge forms a closed loop extending below said predetermined level.

5. The stock watering device of claim 4 wherein said upper continuous surface lies in a single plane.

6. The stock watering device of claim 4 wherein said drinking well is generally cup shaped with an open bottom.

7. The stock watering device of claim 6 wherein said drinking well is integrally joined with said insulated cover portion.

8. The stock watering device of claim 7 wherein said single plane slopes downwardly toward the outer edge of said insulated tank.

9. The stock watering device of claim 5 wherein said lid is insulated and said seat portion includes a groove in the lower surface of said lid, said groove conforming substantially to the shape and dimensions of said upper continuous surface and adapted for engagement therewith when said insulated lid is in its closed position.

10. The stock watering device of claim 9 having stop means for limiting the extent to which said insulated lid can be opened.

11. The stock watering device of claim 9 wherein said insulated cover portion includes a recessed portion and said insulated lid is adapted to fit within said recessed portion.

* * * * *